United States Patent Office 3,424,729
Patented Jan. 28, 1969

3,424,729
PROCESS FOR LIQUID PHASE SEPARATION OF PREPOLYMERS OR PRECOPOLYMERS OF DIALLYLPHTHALATES
Tomoharu Lanaka and Masao Miyamae, Amagasaki-shi, Shinichi Takayama, Nishinomiya-shi, Katsumi Iio, Amagasaki-shi, Tomomitsu Komatsubara, Osaka, and Takeshi Soma, Amagasaki-shi, Japan, assignors to Osaka Soda Co., Ltd., Osaka, Japan, a corporation of Japan
No Drawing. Filed Jan. 19, 1966, Ser. No. 521,509
Claims priority, application Japan, Jan. 21, 1965, 40/3,277
U.S. Cl. 260—78.4
Int. Cl. C08f 3/60, 1/96
7 claims

ABSTRACT OF THE DISCLOSURE

An improved process for the liquid phase separation of the prepolymers or precopolymers of diallylphthalate from a polymerization product containing the same and unreacted monomers by the use of an extractant which is a solvent for the unreacted monomer but non-solvent for such prepolymers or precopolymers, such process being characterized by carrying out the liquid-liquid extraction at temperatures capable of maintaining both the prepolymers or precopolymers and the extractants in a liquid state of free fluidity.

---

The present invention relates to a process for separating the prepolymers or precopolymers of diallylphthalates from the polymerization product solution containing the unreacted monomers thereof. In other words, the present invention enables said prepolymers or precopolymers to be removed very easily in a highly pure state free from unreacted monomers by means of liquid phase separation. The liquid phase extract residue thus obtained can be readily changed in the form of solid prepolymer or precopolymer powders.

The prepolymers or precopolymers of diallylphthalates (unless hereinafter otherwise specified, said prepolymers or precopolymers mean those of diallylphthalates) are thermoplastic polymers with relatively low molecular weights which have unsaturated residue group, and when further polymerized, tend to form a rigid, cross-linked structure. These polymers or copolymers are obtained by addition polymerization of the monomers of tetrafunctional diallylphthalates having two polymerizable double bonds (unless hereinafter otherwise specified, said monomers means those of diallylphthalates, including other unsaturated compounds copolymerizable therewith, when they are used as comonomers). These prepolymers or precopolymers, singly or in blends with other resins, are used in moldings, laminates, coatings, etc. Particularly due to excellent physical and chemical properties including heat resistance, electrical properties and chemical resistance, they are applied in extremely diversified fields. The use of these prepolymers or precopolymers offers many advantages such as ease of handling, reduced curing time, smaller shrinkage in final cure and stability, as compared with the case where the corresponding monomers are employed.

In general uses, the prepolymers or precopolymers are desired to be in various solid forms including free flow powders, flakes or granules from the standpoint of providing facilities in handling, storage and application.

Since the monomers of diallylphthalates are tetrafunctional material with two polymerizable double bonds, they are often gelated in polymerization due to a relatively low conversion rate. The term gelation herein used means that upon polymerization of multifunctional monomers such as those of diallylphthalates, thermoplastic prepolymers or precopolymers with relatively low molecular weights are primary produced which contain polymerizable unsaturated residue group, and that upon further polymerization, the polymerized system passes the stage of such prepolymers or precopolymers and takes the form of solid non-fluid, insoluble, infusible polymers with a net-like construction. When such gelation takes place, the polymer no longer becomes soluble in common solvents and thermoplastic, so that it ceases to be what we desire. Therefore to obtain prepolymers or precopolymers, it is necessary to stop polymerization at least immediately before gelation occurs. The polymerized mixture, which has ceased to be polymerized immediately before gelation contains not only prepolymers or precopolymers but also considerable quantities of the unreacted monomers thereof. In some cases the mixture contains liquid reaction media.

The main bottle neck in the manufacture of prepolymers or precopolymers lies in separating the same in a non-viscous solid powdered form from the polymerization product solution which contains large amounts of unreacted monomers as above described. For instance, even in the case where prepolymers or precopolymers having relatively high molecular weights are to be separated, if an extractant which is non-solvent to the prepolymers or precopolymers but solvent to the monomers thereof is added to the polymerization product solution to precipitate the prepolymers or precopolymers and separate the monomers, then the prepolymers or precopolymers generally settle as viscous lumps, in which the monomers still remain occluded. Consequently it is extremely difficult to remove these monomers from the lumps, even by treating them by an ordinary apparatus. This is prominently the case with the manufacture of particularly those prepolymers or precopolymers with relatively low molecular weights which are thermoplastic and easily melted. Thus the separation of such polymers is accompanied with great difficulties.

Where, in the manufacture of prepolymers or precopolymers of diallylphthalates, they are separated from the resultant polymerization product solution containing unreacted monomers, it has been considerably difficult due to technical shortcomings and consequently strongly desired to obtain with industrial advantage non-viscous solid prepolymer or precopolymer powders.

Since it is difficult to separate pure solid prepolymers or precopolymers from the polymerization product solution, one of the previous methods suggested in relation to such separation was to extract unreacted monomer from the polymerization product solution with an acetone—water system so as to obtain the prepolymers or precopolymers as an acetone solution (United Sates Patent No. 2,613,201).

Consequently the following was actually the only method for directly obtaining dry solid prepolymers or precopolymers. This method (United States Patent No. 3,030,341) comprises passing the solution of prepolymers or precopolymers dissolved in unreacted monomers through the shearing zone by means of, for example, a colloid mill, and at the same time introducing large amounts of unreactive organic solvents as extractants into said shearing zone which are solvent to the monomers, but non-solvent to the prepolymers or precopolymers to precipitate the same, separating said precipitated prepolymers or precopolymers from a mixed solution of the extractants and monomers and obtaining prepolymer or precopolymer powders of free fluidity by washing and drying. However, since the particles of these precipitates retain high viscosity in a solution containing extractants and monomers, it is necessary to maintain low temperatures during the extracting operation, namely, the process of shearing, agitation, filtration and washing. For instance, according to the example of the above-mentioned United States patent, the extraction of orthodiallylphthalate prepolymers requires the temperature to be reduced to 0° C. and that of isodiallylphthalate prepolymers requires cooling to —10° C. Moreover, either case involves a considerable repetition of extraction cycles.

As compared with the former method, this process may indeed be admitted to have made great progress in that it has succeeded in removing prepolymers in a solid state convenient to handling, storage and application. However, it is still accompanied with such difficulties as are described hereunder.

In an extractant, the softening point of prepolymers or precopolymers of diallylphthalates falls below that which is originally possessed by themselves. Particularly in an extractant in which their monomers are dissolved, said softening point falls far below according to the concentration of these monomers. Consequently, considerable amounts of precipitants are required in order to raise the softening point beyond room temperature. This is industrially impossible, as clearly stated in the aforementioned United States Patent No. 3,030,341. Under the extracting conditions, as described in the example of said United States patent, the softening point of powders precipitated during the extracting process always remains below normal temperature. Even if the powders can be precipitated by a strong shearing force, fusion occurs among the powder granules. Consequently it is extremely difficult to keep such glued mass in the state of separate precipitated powder particles. For this reason the process claimed in the aforesaid United States patent involves not only the precipitation of powders by a shearing force using, for example, a colloid mill, but also the cooling of the entire extraction and precipitation system. Furthermore, this process has the serious defect that since a shearing force can not be applied in the separation of precipitates from the extraction solution or the washing process, the temperature should always be maintained at a level below the fusing temperature of these precipitated powders. Since cooling is required, reduction in the extracting speed and efficiency cannot be ignored. Furthermore, said process is accompanied with other disadvantages including long hours of washing, use of considerable amounts of extractants and higher frequencies of washing. The process is also subject to heavy economic losses such as exprenses of cooling and recovering extractants. Moreover, the process consists of a complicated cycle of coagulation of precipitates powder particles—filtration—washing—filtration, and requires frequent repetitions of such a cycle. Therefore, if great quantities are to be treated by said process in a short period of time, equipment with a tremendously large capacity will be required. In addition, since powder particles have always to be prevented from being glued together, a great deal of care and skill is required in controlling and regulating the temperature of all operations involved. All these are the disadvantages which cannot be avoided in the operation of the aforesaid process.

The present inventors have conducted studies to overcome technical defects which the previous methods have not been able to resolve. As a result, we have discovered the following fact. Where the prepolymers or precopolymers of diallylphthalates are separated from the polymerization product solution containing the corresponding unreacted monomers by the use of organic solvents as extractants which are solvent to said monomers, but nonsolvent to said prepolymers or precopolymers, extraction and separation of one liquid phase from another at specific temperatures capable of maintaining both the desired product and extractant in a liquid state of free fluidity, (which is quite different from the conditions under which the desired product is precipitated by the addition of such extractant) can very advantageously eliminate a great many technical failures incidental to the previous methods. They have also discovered that after said unreacted monomers are removed by liquid-liquid phase extraction, the liquid phase extraction residue, namely, the aforesaid prepolymers or precopolymers can be easily made into non-viscous solids by cooling, thus making it possible to obtain dry prepolymers or precopolymers of any desired shape.

The discovery on which the present invention is based will be further described hereunder. The principle of the present invention consists in utilizing the original thermoplastic nature of prepolymers or precopolymers when they are separated from the polymerization product solution. In other words, although prepolymers or precopolymers retain a solid form in their non-solvent medium at normal temperature, heating makes them soften due to their original thermoplastic nature and turns them into a fluid, viscous, liquid substance. Moreover, while the prepolymers or precopolymers remain in such non-solvent medium, their softening point falls below the original level. Therefore, the inventors have discovered that if operation is conducted at temperatures adequately higher than such softening point, the viscosity of prepolymers or precopolymers is reduced and their fluidity is increased. Thus this fact has been applied in the present invention. Consequently if said prepolymers or precopolymers are separated in a liquid state from the polymerization product solution by extractant at temperatures capable of maintaining the entire extraction system at a liquid state of free fluidity and finally the extraction residue is cooled, then solid prepolymers or precopolymers are obtained.

In the process of the present invention, the polymerization product solutoin is introduced into an extractor provided with, for example, an agitator. Then said extractant is charged into the apparatus. Agitation is carried out at temperatures capable of maintaining the entire extractraction system in a liquid state of free fluidity at all times. Upon completion of the agitation and extraction, the extraction system is divided into two liquid phase: one consisting of the extractant containing unreacted monomers and the other consisting of prepolymers or precopolymers containing said extractant. The upper phase is later subjected to distillation to separate and recover said extractant and monomers. Upon cooling to normal temperature, the lower phase becomes solid. This mass consists of solid prepolymers or precopolymers. After crushing, rolling, or granulation, followed by drying, dry, non-viscous solid prepolymers or precopolymers are obtained.

As above described, the process of the present invention utilizes the original thermoplastic nature of prepolymers or precopolymers which is exhibited in the presence of an extractant. Consequently the operation of extraction and separation by this process eliminates the necessity of taking such an extra procedure as preventing the gluing of prepolymer or precopolymer granules caused by their thermoplastic nature, which necessarily occurs in low temperature extraction and separation as has ben practised by the previous methods. In other words, the previous methods must avoid the adhesion of prepolymer or precopolymer particles, whereas the process of the present invention effectively draws upon such viscous nature and utilizes the entire extraction system by making it completely fluid. This is the fundamental difference between the process of the present invention and the previous methods. Moreover, this process is so simple that after agitation, extraction and separation, the extraction residue can be easily made into nonviscous solid prepolymers or precopolymers by cooling said residue to normal temperature.

Thus the process of the present invention has the great merit of eliminating a disadvantageous cycle accompanied with considerable difficulties as have been experienced in the previous methods, including coagulation of colloidal precipiated granules of prepolymers or precopolymers, filtration, frequent washing and cooling of the entire extraction system. According to the process of the present invention, the object of extracting polymerization product solution containing the corresponding unreacted monomers and liquid reaction media (hereinafter sometimes referred to as the "feed") is attained simply by mixing them with an extractant and agitating the mass at temperatures capable of maintaining the same in a liquid state of free fluidity and conducting a liquid-liquid phase extraction. Another important characteristic of the present invention is that the extracting operation is simple and rapid. For instance, the use of an apparatus, as described later, completes extraction in several minutes.

Let us compare the process of the present invention with the previous methods more closely in this respect. In the previous methods, precipitation takes place immediately due to a high shearing force, but the precipitates particles contain monomers. The extraction of these monomers necessarily involves not only a solid-liquid phase extraction system but also low temperature operation. Thus the extracting speed is for slower than that attained by the liquid-liquid phase extraction of the present invention. Moreover, since the previous methods additionally require a cycle of coagulation of precipitated particles, and carrying out frequent filtrations and washing, the time of extraction by these methods is naturally much longer than is required in the process of the present invention. Further with respect to the amount of extractant used, the process of the present invention makes it unnecessary to apply extra amounts of extractant in preventing the gluing of precipitated particles of prepolymers or precopolymers as has been observed in the previous methods, and saves the extractant to that extent. In addition, the process of the present invention has considerable industrial advantages, including the fact that the equipment for extraction and recovery of extractant can be reduced in size by the extent of such saving. Another advantage of the process of the present invention is that it requires no such high technical skill as is demanded of the previous methods, including cooling to prevent the adhesion of precipitated granules of prepolymers or precopolymers, control of extractant amounts and determination of temperatures in the settling of precipitates at the time of filtration.

The polymerization product solution of diallylphthalates to which the process of the present invention is applicable may include any that has ceased to be polymerized just before gelation, regardless of the polymerizing method involved. The rate at which the monomers are converted into prepolymers or precopolymers just before gelation takes place widely vary with the methods and conditions of polymerization. However, the process of the present invention permits the use of prepolymers or precopolymers obtained at any conversion rate. Generally the materials having a polymerization degree of 10 to 60% are applicable to the process at the present invention.

The separation by the invented process of prepolymer or precopolymers from the polymerization product solution is carried out in the following manner. The polymerization product solution consisting of prepolymers or precopolymers dissolved in the unreacted monomers (in some cases containing other liquid reaction media) is mixed with an extractant in which the monomers or said liquid reaction media are soluble, but the prepolymers or precopolymers are insoluble. Agitation and extraction is performed at temperatures enabling the entire extraction system to have free fluidity. Upon cooling the separated lower phase of said extraction system, solid prepolymers or precopolymers are obtained. Where the polymerization product solution consists of prepolymers or precopolymers and relatively large amounts of monomers or other reaction media, the following procedure is particularly effective.

When the first extraction is preliminarily carried out at relatively low temperatures using relatively small amounts of the extractant which conforms to the aforementioned conditions, the extraction system is divided into the upper and lower liquid phases: the former representing the extractant phase mainly consisting of the extractant and monomers (in some cases containing reaction media) and the latter the extraction residue phase containing the prepolymers or precopolymers and small amounts of monomers (in some cases containing reaction media). The term "relatively low temperatures" herein used generally means the neighborhood of normal temperature, but depending on circumstances, temperatures beyond that level. The term "relatively small amounts of the extractant" herein used means such amounts as can substantially prevent the prepolymers or precopolymers from being dissolved into the upper extractant phase consisting of the monomers and extractant (in some cases containing reaction media). The amount of extractant generally used with preference ranges from 0.5 to 8 times the weight of the polymerization product solution. Under such conditions, the lower extraction residue phase mainly consisting of prepolymers or precopolymers still contain some amounts of monomers (in some cases also containing reaction media). Consequently this phase is a viscous but completely fluid liquid at normal temperature (depending on circumstances, at temperatures beyond the normal range, for example, from 20° to 80° C.). After this phase is separated from the aforementioned two-liquid phase system, the extractant conforming to the aforesaid condition is additionally introduced into it. The mass is subjected to the second agitation and extraction in an extractor. Generally as the monomers (in some cases containing reaction media) are drawn out of the polymerization product solution or said extraction residue by extractant, the viscosity of the prepolymer or precopolymer phase progressively increases until it forms a lumpy highly viscous mass which makes agitation impossible at normal temperature. However, the process of the present invention utilizes the original thermoplastic nature of prepolymers or precopolymers which is displayed in the presence of an extractant and softens said lumpy prepolymer or precopolymer phase by heating the entire extraction system to make said lumpy phase a liquid mass of free fluidity. Thus the monomers held in said lumpy mass are easily extracted. For the purpose of this invented process, heating must be applied as required until the entire extraction system is made into a liquid of sufficient fluidity to facilitate agitation and extraction.

The heating temperature may vary with the polymerization degree and amount of prepolymers or precopolymers dissolved in the polymerization product solution and the kind and amount of extractant charged. However, to maintain both the prepolymers or precopolymers and the extractant in a liquid state of free fluidity, temperatures around the normal level or ranging from the normal to 80° C. are generally used. Of course depending on changes in the foregoing factors, lower temperatures, for example, 10° to 20° C., may be applied. For instance, where 0.5 part of methanol extractant is present on the basis of 100 wt. parts of diallylphthalate prepolymer having a polymerization degree of 25%, 10° C. or lower is sufficient to maintain these materials in a liquid state and for the use of the process of the present invention.

According to this process the entire extraction system is kept in a liquid state, so that the contact between the feed and extractant is of the liquid-to-liquid type. Consequnetly as compared with the previous methods in which the contact between the feed and the extractant is of the solid-to-liquid type, the invented process has the advantage that the monomers as extraction solute diffuse into the extractant at a higher rate and the extraction speed is quickened to that extent.

For the purpose of the present invented process, any type of extractor may be used. However, since the extraction residue is a liquid of slightly high viscosity, an extractor provided with a continuous kneader of such type as is generally used in kneading a highly viscous substance is preferably used in order to carry out effective extraction. But it is unnecessary to choose an extractor particularly of the type which produces a shearing force. Said kneader consists of a stationary cylindrical element and a rapidly turning rotor which is similarly cylindrical and surrounded by said element with a narrow space. This type of kneader is used where creamy or starchy substances of relatively high viscosity are kneaded. When the polymerization product solution of prepolymers or precopolymers containing unreacted monomers (in some cases reaction media) or said polymerization product solution from which part of the monomers has previously been removed by extraction at normal temperature or over, and the extractant (which is solvent to the monomers and reaction media, but non-solvent to the prepolymers or precopolymers) are introduced at the same time into such a kneader-type extractor to remove said prepolymers or precopolymers, the extactant phase and the extraction residue phase are drawn out of the extractor at the same time. However, since they form two distinct liquid phases, they are easily separated. As above described, it is generally preferable to carry out extraction twice per cycle. However, as occasion requires, a single extraction may be sufficient to attain the object. If desired, extraction may be made three or more times. However, it is usually unnecessary.

As above described, the extractant used in the process of the present invention is of such type as is solvent to the unreacted monomers and reaction media if contained, but non-solvent to the prepolymers or precopolymers. For the purpose of this process, low-grade saturated aliphatic alcohols are particularly preferable. They can be easily separated from the prepolymers or precopolymers, and dried, also removed from the solution of unreacted monomers easily. Consequently they have the advantage that they facilitate the recovery and recirculation of both the extractant and monomers. These low grade saturated aliphatic alcohols may include $C_1$ to $C_4$ alcohols, for example, methanol, ethanol, n-propanol, isopropanol, n-butanol, isobutanol, and secondary butanol.

The monomers of diallylphthalates are polymerized at a low conversion rate and often gelated, even when the polymerizing conditions are strictly controlled. In such a case, it is necessary to separate dissolved prepolymers or precopolymers from the unreacted monomers which naturally amount to large quantities. Since extraction and separation of said prepolymers or precopolymers all at once would require considerable quantities of extractant, it may be considered to concentrate the solution of polymerization product having such a low conversion rate by means of distillation at reduced pressure. In such a case it is convenient and effective to repeat extraction for the second time with respect to the extraction residue obtained by preliminarily extracting as much monomer as possible with small amounts of extractant in the primary extraction stage as above described. This is because of the advantage that the secondary extraction requires small amounts of extractant and that the extractant can be used in counter current to that applied in the primary extraction. In such a counter current extraction process, the extraction solution obtained from the secondary extraction can be used directly as extractant in the primary extraction of the next cycle. The reason is that since most of the monomer is drawn out in the primary extraction, the extraction solution obtained from the secondary extraction contains nothing but the monomer remaining in the primary extraction residue. The amount of said monomer in the secondary extraction solution is far smaller than that of the monomer contained in the primary extraction solution, so that the secondary extraction solution can be used once more directly as extractant in the primary extraction of the following cycle. Such counter current extraction saves the extra cost and time of recovering the extractant and monomer from the extraction solution, thus ensuring the effective use of extractant. This is also one of the great advantages gained by the present invention.

While the amounts of extractant used in the primary extraction vary with the contents of unreacted monomer and the temperatures involved, the quantities of said extractant is usual application range from 0.5 to 8 times the weight of the polymerization product solution. When the amount of extractant falls below this range, larger quantities of the prepolymers or precopolymers tend to move into the extraction solution. When the extractant amount is further reduced, it is sometimes difficult to divide the extraction system into two liquid phases. Consequently it is necessary to select such amounts of extractant as facilitate extractant and separation in accordance with the ratio of prepolymers or precopolymers to monomers, kind of extractant and extraction temperatures, etc. On the other hand, even if the amounts of extractant rise beyond the aforementioned range, the extracting efficiency improves very little. Consequently, it is unnecessary to use excess amounts of extractant. Generally, the application of extractant ranges from 0.5 to 8 times the weight of the polymerization product solution, or preferably 0.5 to 5 times.

When an extraction cycle is conducted by two steps, the adequate amounts of extractant used in the secondary extraction range similarly between 0.5 and 8 times, preferably 0.5 and 5 times, the weight of the original solution of polymerization product, although these amounts vary with the temperatures involved and the quantities of extractant employed in the primary extraction. However, the aforesaid range is not subject to any limitation. For instance, in many cases where part or the whole of the extraction solution obtained from the secondary extraction is used as extractant in the primary extraction of the following cycle, the amounts equal to 0.5 to 8 times the weight of the polymerization product solution may also be used.

The conditions for extraction temperature generally depend on the solubility of a particular extraction system. The process of the present invention requires such temperatures as will maintain particularly the entire extraction system in a liquid state of free fluidity. Consequently the extraction temperature varies with the kind of extractant used. In common application, however, temperatures around the boiling point of the extractant or lower, for example, 10° to 20° C. may be used but for the purpose of the present invention, said temperature is not specifically limited, so long as it is sufficient to maintain the entire extraction system in a liquid state of free fluidity.

Upon completion of extraction, prepolymers or precopolymers can be discharged simply and easily from an extraction vessel or continuous kneader-type extractor. The prepolymer or precopolymer phase removed from the extractor is a liquid substance of free fluidity and constitutes a distinct phase from the extractant phase. Consequently the prepolymers or precopolymers are removed simply by separating these two different liquid phases. The prepolymer or precopolymer phase thus separated generally contains 25 to 30% of extractant, so that if the temperature of said phase after separation stands at the same level as in extraction, said phase remains in a liquid state of sufficient fluidity. Consequently when the material is directly cooled and rolled by proper means, solid prepolymers or precopolymers are obtained. For instance, when the prepolymer or precopolymer phase is poured on the rolls which are cooled to normal temperature, it is cooled and rolled into solid prepolymers or precopolymers. The advantage of this process is that most of the extractant contained in said prepolymers or precopolymers is squeezed out at the same time. Further advantage is that the solid prepolymers or precopolymers thus rolled from powders or flakes only by drying without crushing.

In some case, the fluid prepolymer or precopolymer phase is made only by cooling into a solid lump, which is later crushed and dried. In others, said liquid phase is extruded through a large number of fine orifices bored on a plate to form linear solid prepolymers or precopolymers. Thus the method of treating the liquid prepolymer or precopolymer phase after being discharged from the extractor is not particularly limited. The fact while the prepolymer or precopolymer phase remains in a liquid state in the course of extraction, it solidifies immediately upon cooling to normal temperature is one of the characteristics of the present invention.

Although the process of the present invention involves relatively high temperatures for extraction, low grade saturated aliphatic alcohols used as extractants have the nature of acting as an inhibitor or retarder of polymerization. Consequently this process is free from the possibility of prepolymers or precopolymers being further polymerized among themselves. Again where, after extraction and separation, the prepolymer or precopolymer phase is allowed to stand at high temperatures for relatively long hours, there is no danger of further polymerization, because said phase contains 25 to 30% of low grade saturated aliphatic alcohols. Moreover, since the whole extraction cycle by the process of the present invention only requires an extremely short time, the occurrence of such further polymerization is far less possible.

Where the polymerization product solution contain particularly considerable amounts of oligomers, the process of the present invention is very effective as compared with the previous low temperature methods. The polymerization product solution to which the process of the present invention is applicable contains, in addition to unreacted monomers (which may contain reaction media) and prepolymers or precopolymers, other types of polymers known as oligomers which have lower molecular weights than the prepolymers or precopolymers, but higher molecular weights than the monomers. The generation of these oligomers widely varies with the methods and conditions of polymerization. They are soluble in the extractant, though to an extremely small extent. Their solubility depends on temperatures. At normal temperature, they have so low molecular weights that they indicate adhesivity. If they are carried into prepolymers or precopolymers, dry solid powdered products prepared therefrom sometimes turn into a lumpy mass, because their granules are glues together depending on changes in room temperature, pressure, etc. In low temperature extraction, larger amounts of these oligomers remain in the prepolymers or precopolymers than in high temperature extraction, because the solubility of said oligomers in the extractant is lower at low temperatures than at high temperatures. Thus the product by the process of the present invention which involves higher temperatures than the previous methods is superior in respect of storage stability. This is also a strong point of the present invention. To give an illustration testifying to this fact, the polymerization product solution obtained by the polymerizing method shown in Examples 8 and 9, namely, by polymerizing orthodiallylphthalate or isodiallylphthalate at 260° C. contained large amounts of such oligomers. Consequently, it was almost impossible to obtain dry powdered prepolymers from said solution by the previous methods. However, the process of the present invention easily produced non-viscous powdered prepolymers from said solution.

The prepolymers of diallylphthalates to which the process of the present invention is applicable include orthodiallylphthalate prepolymer and isodiallylphthalate prepolymer. These prepolymers may be used either in the homogeneous form or in copolymers with other unsaturated compounds which are copolymerizable with said prepolymers. Such unsaturated compounds may include, for example, triallylcyanurate, diallylmaleate, triallylphosphate, acrylate esters, and styrene, etc.

The present invention will be more clearly understood with reference to the examples which follow. It should be noted, however, that the present invention is not limited to these examples.

Example 1

100 weight parts (unless otherwise specified, the term "part" means a weight part in the other examples given below) of the polymerization product solution consisting of 25% of orthodiallylphthalate prepolymer and the unreacted monomer thereof and 200 weight parts of methanol were charged at 40° C. into an extractor provided with a reduced speed agitator rotating at 200 r.p.m. (unless otherwise specified in the following examples, the apparatus used is of this type) and were subjected to the primary agitation and extraction for 5 minutes (in this case, the entire extraction system was in a liquid state of free fluidity). Upon completion of agitation, the extraction system was divided into two distinct liquid phases. The supernatant solution mainly consisting of methanol and the monomer was removed by decantation. 240 parts of fresh methanol were added to the lower extraction residue phase mainly containing the prepolymer. The mass was subjected to the secondary agitation and extraction at 65° C. for 5 minutes. Upon completion of agitation, said extraction system was divided into two separate liquid phases (in this case, the entire system was in a liquid state of free fluidity). The lower prepolymer phase was drawn out of the extractor bottom to separate it from the supernatant phase. The prepolymer phase was formed into a solid lump by cooling. Later by crushing, 25 parts of white solid prepolymer powders were obtained. Said prepolymer had an iodine value of 56 and a viscosity of 89.5 cp. at 30° C. in a 50% methylethylketone solution. For comparison, the aforementioned polymerization product solution was subjected to precipitation and separation at a low temperature of 0° C. as has been used in the previous methods. Before a product having the same quality as the product of Example 1 could be obtained, 1,000 parts of methanol were introduced in relation to 100 parts of the polymerization product solution, and separation had to be repeated four times for purification.

Example 2

To 100 parts of the polymerization product solution consisting of orthodiallylphthalate prepolymer having a conversion rate of 25% (same as that used in Example 1) and the unreacted monomer thereof were added as extractant 240 parts of the extraction solution obtained in the secondary extraction of Example 1. The mass was subjected to the primary extraction at 40° C. for 5 minutes in the same extractor as that used in Example 1. The supernatant solution which was separated immediately upon completion of agitation was removed by decantation. 240 parts of fresh methanol were added to the lower prepolymer phase and the secondary extraction was conducted at 65° C. for 5 minutes. After being separated from the extraction solution, said prepolymer phase was cooled for solidification. Upon crushing and drying, 25 parts of white solid prepolymer powders were obtained. This prepolymer had an iodine value of 56.1 and a viscosity of 89.3 cp. at 30° C. in a 50% methylethylketone solution.

Example 3

The primary extraction was conducted at 20° C with respect to the polymerization product solution consisting of orthodiallylphthalate prepolymer having a conversion rate of 25% and the unreacted monomer thereof (a different lot from the solution of Examples 1 and 2) with the quantity of methanol equal to 1.5 times the weight of said solution. The extraction residue obtained (a liquid of free fluidity) and methanol were charged into a continuous kneader-type extractor with an inner capacity of 0.8 liter in which the rotor and the stationary element were spaced 3 mm. from each other and which was adjusted to operate at a flow rate of 87 liter per hour with a number of rotation of 900 r.p.m. The secondary extraction was conducted at 60° C. In this case the methanol and feed were continuously charged into the extractor in such amounts that the weight of said methanol was always equal to 3 times that of the original polymerization product solution. The time the whole of these two materials was retained in the extractor averaged about 33 seconds. The prepolymer phase discharged from the extractor was separated from the extraction solution which also taken out at the same time. Said prepolymer phase was poured on the rolls which had previously been water cooled, and was subjected to cooling and rolling, and at the same time the contained extractant was squeezed out. The solid prepolymer thus rolled was mostly made into flakes and partly into powders simply by air drying. This prepolymer had an iodine value of 61 and a viscosity of 85 cp. at 30° C. in a 50% methylethylketone solution.

Example 4

20 kg. of the polymerization product solution consisting of isodiallylphthalate prepolymer having a conversion rate of 25% and the unreacted monomer thereof and 41.6 kg. of methanol were charged into a 200 liter stainless extractor provided with an agitater rotating at 300 r.p.m. The primary extraction was carried out at 40° C. for 20 minutes. After the stop of agitation, the separated supernatant solution was drawn out by a suction pump. Then 56 kg. of fresh methanol was added to the extraction residue. Extraction was performed for the second time at 60° C. for 20 minutes. Upon completion, the separated supernatant solution was drawn out by a suction pump. On the other hand the prepolymer phase, while maintained at 60° C., was poured on the water-cooled rolls from the extractor bottom, and cooled for solidification and rolled, and at the same time the contained methanol was squeezed out of the prepolymer phase. At this time, said phase contained 25 to 30% of methanol, but rolling reduced the methanol content to 10%. Upon crushing and drying, 5 kg. of white solid prepolymer powders was obtained. This prepolymer had an iodine value of 86 and a viscosity of 136 cp. at 30° C. in a 50% methylethylketone solution.

Example 5

60 parts of orthodiallylphthalate, 40 parts of triallylcyanurate and 1 part of benzoyl peroxide were introduced into a reactor. While stirring, they were polymerized at 90° C. for 40 minutes. At this time the monomers were converted into a precopolymer at the rate of 15%. 200 parts of methanol were added to 100 parts of the aforesaid copolymerization product solution. The primary extraction was carried out while stirring at normal temperature for 5 minutes. The separated supernatant solution was removed by decantation. 250 parts of fresh methanol were added to the precopolymer phase obtained as the extraction residue. Agitation and extraction was carried out for the second time at 60° C. for 5 minutes. The separated supernatant solution was removed by decantation. The extraction residue was cooled for solidification. Upon crushing and drying, 15 parts of white solid precopolymer powders more obtained. This precopolymer had an iodine value of 108 and a viscosity of 329 cp. at 30° C. in a 50% methylethylketone solution.

Example 6

800 parts of methanol were added to 100 parts of the polymerization product solution consisting of orthodiallylphthalate prepolymer having a conversion rate of 25% and the unreacted monomer thereof. Extraction was carried out at 65° C. for 10 minutes. The separated supernatant solution was removed by decantation. The extraction residue was cooled for solidification. Upon crushing and drying, 25 parts of solid prepolymer powders were obtained. This prepolymer had an iodine value of 68 and a viscosity of 54 cp. at 30° C. in a 50% methylethylketone solution.

Example 7

250 parts of isobutanol were added to 100 parts of the polymerization product solution consisting of orthodiallylphthalate prepolymer having a conversion rate of 25% and the unreacted monomer thereof. The primary extraction was conducted at normal temperature for 5 minutes. Upon completion of agitation, the separated supernatant solution was removed by decantation. 250 parts of fresh isobutanol were added to the extraction residue and the secondary extraction was performed at 60° C. for 5 minutes. The separated supernatant solution was removed by decantation. The extraction residue was cooled for solidification. Upon crushing and drying, 25 parts of white solid prepolymer powders were obtained. The prepolymer had an iodine value of 58 and a viscosity of 90 cp. at 30° C. in a 50% methylethylketone solution.

Example 8

The orthodiallylphthalate prepolymer used in this example was prepared particularly in the following manner. Orthodiallylphthalate monomer was polymerized while stirring in nitrogen streams at 260° C. for 50 minutes. At this time the monomer was converted into a prepolymer at the rate of 53%. 70 parts of methanol were added to 100 parts of the aforesaid polymerization product solution. The primary extraction was carried out at 20° C. for 5 minutes. The separated supernatant solution was removed by dectantation. 120 parts of fresh methanol were added to the extraction residue obtained, and the secondary extraction was conducted at 60° C. for 5 minutes. After the supernatant solution was separated from the extraction system, 120 parts of fresh methanol were again added to said extraction residue and extraction was performed for the third time at 60° C. for 5 minutes. After being separated from the supernatant solution, the extraction residue was cooled, crushed and dried. Thus 49 parts of white solid prepolymer powders were obtained. This prepolymer had an iodine value of 66 and a viscosity of 107 cp. at 30° C. in a 50% methylethylketone solution. The reason for which only 49 parts of prepolymer were obtained from the polymerization solution having a rate of polymerization of 53% is that 4% of oligomer was extracted with the high temperature methanol.

For comparison, the polymerization product solution used in this example was subjected to extraction by the previous methods. Namely, 800 parts of methanol were added to 100 parts of the aforesaid polymerization product solution. The prepolymer was dispersed into the methanol in a powdered state at temperatures between −20° and −10° C. by means of a homomixer rotating at about 4,000 r.p.m. (which consists of a rapidly turning rotor surrounded by a stationary element with a narrow space and strongly shears fluid or powders passing through said space). To separate the extraction solution, the rotation of the homomixer was stopped and the extraction system was allowed to stand. However, precipitated particles were glued together before the subsequent washing step could be taken. Consequently it was impossible to obtain prepolymer powders. This is because the prepolymer contains 4% of oligomer which causes said prepolymer to be glued together.

Example 9

The isodiallylphthalate prepolymer used in this example was prepared in the following manner. The isodiallylphthalate monomer was polymerized in nitrogen streams while stirring at 260° C. for 140 minutes. At this time the monomer was converted into a prepolymer at the rate of 40%. 160 parts of methanol were added to 100 parts of the aforesaid polymerization product solution and the primary extraction was carried out at 20° C. for 5 minutes. The separated extraction solution was removed by decantation. 200 parts of fresh methanol were added to the extraction residue obtained. The secondary extraction was conducted at 65° C. for 5 minutes. The separated extraction solution was removed by decantation. 200 parts of fresh methanol were added to the extraction residue obtained and extraction was performed for the third time at 65° C. for 5 minutes. The extraction residue obtained by separating the extraction solution was cooled for solidification. Upon crushing and drying, 38 parts of white prepolymer powders were obtained. This prepolymer had an iodine value of 85 and a viscosity of 170 cp. at 30° C. in a 50% methylethylketone solution. The reason for which only 38 parts of prepolymer was obtained from the polymerization solution having a rate of polymerization of 40% is that 2% of oligomer is extracted with the high temperature methanol.

For control, conventional methods were practiced only to prove that it is impossible to obtain non-adhesive dry prepolymer powders as in Example 8.

Example 10

50 parts of orthodiallylphthalate, 50 parts of toluene and 2 parts of benzoyl peroxide were polymerized in nitrogen streams in a reactor while stirring at 100° C. for 3 hours. At this time the monomer was converted into a prepolymer at the rate of 46%. 150 parts of methanol were added to 100 parts of the polymerization product solution from which 80% of the toluene charged had been removed by distillation. The primary extraction was carried out at normal temperature. 250 parts of fresh methanol were added to the extraction residue obtained, and extraction was performed for the second time at 65° C. for 5 minutes. The extraction residue obtained was cooled for solidification. Upon crushing and drying, 38.3 parts of white prepolymer powders were obtained. This amount means that 46% of the raw monomer was converted into a prepolymer. This prepolymer had an iodine value of 39 and a viscosity of 62 cp. at 30° C. in a 50% methylethylketone solution.

We claim:

1. Process for liquid phase separation of the prepolymers or precopolymers of diallylphthalate which comprises separating said prepolymers or precopolymers of diallylphthalate from the polymerization product solution containing the corresponding unreacted monomers by using as an extractant a non-reactive organic solvent which is a solvent for said monomers but non-solvent for said prepolymers or precopolymers, such process being characterized by carrying out a liquid-liquid extraction at temperatures at at least 10° C. and capable of maintaining both said prepolymers or precopolymers and said extractant in a liquid state of free fluidity to divide said polymerization product solution into two liquid phases: (1) the extractant phase containing said unreacted monomers and (2) the prepolymer or precopolymer phase containing said extractant.

2. Process described in claim 1 in which said polymerization product solution consists of orthodiallylphthalate prepolymer and the monomer thereof.

3. Process described in claim 1 in which polymerization product solution consists of isodiallylphthalate prepolymer and the monomer thereof.

4. Process described in claim 1 in which said polymerization product solution consists of precopolymers of the monomers of diallylphthalates and other unsaturated compounds copolymerizable therewith the monomers of these components.

5. Process described in claim 1 in which said polymerization product solution contains liquid reaction media in addition to said prepolymers or precopolymers and the monomers thereof.

6. Process described in claim 1 in which the extractants consist of low grade saturated aliphatic monoalcohols having 1 to 4 carbon atoms.

7. Process described in claim 1 in which the extraction residue obtained by removing part of the unreacted monomers from the polymerization product solution by a primary extraction constitutes the polymerization product solution containing prepolymers or precopolymers which is subjected to a secondary extraction.

References Cited

UNITED STATES PATENTS

| | | | |
|---|---|---|---|
| 2,613,201 | 10/1952 | Anderson et al. | 260—78.4 |
| 2,832,758 | 4/1958 | Heiberger et al. | 260—78.4 |
| 3,030,341 | 4/1962 | Willard | 260—78.4 |

JOSEPH L. SCHOFER, *Primary Examiner.*

C. A. HENDERSON, JR., *Assistant Examiner.*

U.S. Cl. X.R.

260—78.5, 86.1, 88.1, 80